United States Patent [19]

Shirai et al.

[11] Patent Number: 5,053,464
[45] Date of Patent: Oct. 1, 1991

[54] POLYURETHANE CONTAINING METAL PHTHALOCYANINE IN THE MAIN CHAIN

[75] Inventors: Hirofusa Shirai, Chiisagata; Naomi Masuda, Shizuoka; Tatsuya Hongu, Nerima; Nobuhisa Tsutsumi, Itano, all of Japan

[73] Assignee: Hirofusa Shirai & Nisshinbo Industries, Inc., Tokyo, Japan

[21] Appl. No.: 570,117

[22] Filed: Aug. 20, 1990

[30] Foreign Application Priority Data

Dec. 8, 1989 [JP] Japan .................................. 1-320068
Dec. 8, 1989 [JP] Japan .................................. 1-320069

[51] Int. Cl.$^5$ .............................................. C08G 18/34
[52] U.S. Cl. ................................... 525/454; 502/159; 528/71; 528/73; 540/129
[58] Field of Search .................. 525/454; 528/71, 73; 502/159; 540/129

[56] References Cited

U.S. PATENT DOCUMENTS 3,879,336  4/1975  Mseda et al. ........................... 528/73

Primary Examiner—Maurice J. Welsh
Attorney, Agent, or Firm—Parkhurst, Wendel & Rossi

[57] ABSTRACT

A polyurethane containing a metal phthalocyanine in the main chain is a novel compound and can be divided into two groups; one of which is a linear polymer and the other of which is a cross-linked polymer. This substance is useful as a redox catalyst due to the peculiar properties of the metal phthalocyanine. The polyurethane can be prepared by reacting a metal phthalocyanine polycarboxylic acid with thionyl chloride to obtain a metal phthalocyanine polycarboxylic acid polychloride; synthesizing a metal phthalocyanine polyhydroxy ester from the metal phthalocyanine polycarboxylic acid polychloride and a diol: HO—R$^1$—OH through a dehydrochlorination; and then addition-condensation-polymerizing the resulting metal phthalocyanine polyhydroxy ester, a diol: HO—R$^2$—OH and a diisocyanate. The polyurethane containing a metal phthalocyanine in the main chain is dissolved in an organic solvent to obtain a stock solution for spinning and the stock solution is spun according to a wet spinning technique to give a polyurethane fiber comprising the polyurethane containing a metal phthalocyanine in the main chain.

20 Claims, 4 Drawing Sheets

POLYURETHANE CONTAINING METAL PHTHALOCYANINE IN THE MAIN CHAIN

BACKGROUND OF THE INVENTION

The present invention relates to a novel polymeric compound, a polyurethane containing a metal phthalocyanine in the main chain. The polymer is useful as a material having an ability of photoelectric conversion, a physiological function and a function as a redox catalyst.

Up to now, the metal phthalocyanine has widely been employed as blue and green pigments and dyes. The metal phthalocyanine is a metal complex which has a very stable large cyclic planar ligand and has a tetraazaporphyrin skeleton. Since the metal phthalocyanine forms a special electronic environment having a large $\pi$ electron system, it has recently attracted special interest as a variety of functional materials such as catalystic, electronic, light-energy conversible and physiological functions although the metal content thereof is very low.

The combination of phthalocyanine having such useful functions to a polymer makes it possible to impart such various functions of phthalocyanine to the resulting polymer. For instance, it becomes possible to design various materials having a variety of functions such as deodorizing polymers and conductive polymers. One example of such techniques is disclosed in Japanese Patent Provisional Publication No. 63-273638 which relates to a polyester containing metal phthalocyanine rings in its main chain.

The inventors of this invention have conducted studies of models of a series of redox enzymes in vivo utilizing metal phthalocyanines having functions similar to those of the metal porphyrin existing in living bodies in order to develop an artificial enzyme. As a result, the inventors have found out that the metal phthalocyanine is preferably combined with a polymeric compound in order to enhance the catalytic function of the metal phthalocyanine as a redox enzyme and thus have completed the present invention.

Accordingly, a first object of the present invention is to provide a polyurethane containing a metal phthalocyanine in the main chain. The polyurethane containing a metal phthalocyanine in the main chain is a novel polymeric compound and shows an excellent catalytic function as a redox enzyme. It is possible to form a variety of molded products from the polymeric compound, such as a film and a block.

A second object of the present invention is to provide a method for preparing a polyurethane containing a metal phthalocyanine in the main chain in high yield.

A third object of the present invention is to provide a redox catalyst comprising a polyurethane containing a metal phthalocyanine in the main chain.

A fourth object of the present invention is to provide a fiber comprising a polyurethane containing a metal phthalocyanine in the main chain. The resulting fiber has a function catalytically promoting the oxidation of mercaptans which are substances giving out bad smell and, therefore, it is useful as a deodorizing fiber.

Fifth object of the present invention is to provide a method for preparing a fiber which comprises a polyurethane containing a metal phthalocyanine in the main chain.

According to an aspect of the present invention, there are two types of polymer structures of polyurethanes containing a metal phthalocyanine in the main chain. One of the polymer structures comprises repeating units represented by the following general formula [I]:

wherein $R^1$ represents a group $-(CH_2CH_2O)_n-C_2H_4-$ (n is an integer of 0 to 3), $R^2$ represents a group $-(CH_2)_6-$, $-(CH_2)_{10}-$ or $-(CH_2CH_2O)_2-C_2H_4-$; M represents a metal atom selected from the group consisting of Co, Fe, Mn, Ti, V, Ni, Cu, Zn, Mo, W, Os and Ca; and x/y ranges from 0.1/99.9 to 90.0/10.0. The polymer has a molecular weight ranging from 1,000 to 200,000.

The other of the polymer structures comprises repeating units represented by the following general formula [II]:

wherein $R^1$, $R^2$, M and x/y are the same as those defined above in connection with the general formula [I] and which has a molecular weight ranging from 1,000 to 200,000.

According to another aspect of the present invention, there is provided a method for preparing a polyurethane containing a metal phthalocyanine in the main chain represented by the foregoing general formula [I] or [II] which comprises the steps of reacting a metal phthalocyanine polycarboxylic acid with thionyl chloride to obtain a metal phthalocyanine polycarboxylic acid polychloride; synthesizing a metal phthalocyanine polyhydroxy ester from the metal phthalocyanine polycarboxylic acid polychloride and a diol, i.e. HO—$R^1$—OH ($R^1$ is the same as that defined above) through a dehydrochlorination; and then addition-condensation-polymerizing the resulting metal phthalocyanine polyhydroxy ester, a diol, i.e. HO—$R^2$—OH ($R^2$ is the same as that defined above) and a diisocyanate.

According to a further aspect of the present invention, there is provided a polymeric catalyst for redox reactions which comprises a polymer containing a metal phthalocyanine in the main chain composed of repeating units represented by the foregoing general formula [I] or [II].

According to a still another aspect of the present invention, there is provided a fiber which comprises a polyurethane containing a metal phthalocyanine in the main chain composed of repeating units represented by the foregoing general formula [I] or [II].

According to a still further aspect of the present invention, there is provided a method for preparing a fiber which comprises a polyurethane containing a metal phthalocyanine in the main chain composed of repeating units represented by the foregoing general formula [I] or [II], the method comprising the steps of reacting a metal phthalocyanine polycarboxylic acid with thionyl chloride to obtain a metal phthalocyanine polycarboxylic acid polychloride; synthesizing a metal phthalocyanine polyhydroxy ester from the metal phthalocyanine polycarboxylic acid polychloride and a diol, i.e. HO—$R^1$—OH ($R^1$ is the same as that defined above) through a dehydrochlorination; then addition-condensation-polymerizing the resulting metal phthalocyanine polyhydroxy ester, a diol, i.e. HO—$R^2$—OH ($R^2$ is the same as that defined above) and a diisocyanate to obtain a polyurethane containing a metal phthalocyanine in the main chain; dissolving the polyurethane containing a metal phthalocyanine in the main chain in an organic solvent to form a stock solution for spinning, and subjecting the stock solution to wet spinning to form a fiber.

As described above, the polyurethane containing a metal phthalocyanine according to the present invention is a linear polymer on the one hand (repeating units thereof being represented by the general formula [I]) and a cross-linked polymer on the other hand (repeating units thereof being represented by the general formula [II]).

The polymeric compounds of which repeating units are represented by the general formula [I] or [II] can be synthesized as follows:

First, a metal phthalocyanine polycarboxylic acid as a starting material is reacted with thionyl chloride: $SOCl_2$ to obtain a metal phthalocyanine polycarboxylic acid polychloride. The resulting metal phthalocyanine polycarboxylic acid polychloride is then reacted with a diol represented by the general formula: HO—$R^1$—OH through a dehydrochlorination to obtain a metal phthalocyanine polyhydroxy ester derivative.

The resulting metal phtalocyanine polyhydroxy ester derivative, a diol represented by the general formula: HO—R²—OH and 1,6-hexane diisocyanate: OCN—(CH₂)₆—NCO are heated in dimethylformamide (DMF) under a nitrogen gas stream. Thus, each hydroxyl group in the metal phthalocyanine polyhydroxy ester derivative and the diol represented by the general formula: HO—R²—OH is reacted with the isocyanate groups of the 1,6-hexane diisocyanate through an addition-polymerization reaction to form urethane bonds: —OOCNH— and to thus give polyurethane.

For instance, the reaction scheme for preparing polyurethane of the present invention using a metal phthalocyanine dicarboxylic acid as a starting material is as follows:

The cross-linked polymers represented by the general formula [II] can likewise be sythesized in the same manner as explained above in connection with the linear polymers represented by the general formula [I] except that a metal phthalocyanine tetracarboxylic acid is sub- stituted for the metal phthalocyanine dicarboxylic acid as a starting material.

The reaction scheme for the preparation of the cross-linked polymers will be described below:

Preferred examples of the diol: HO—R$^1$—OH used in foregoing each preparation process are ethylene glycol, diethylene glycol, triethylene glycol, tetraethylene glycol, 1,6-hexanediol and p,p'-biphenol. It is preferred to use, for instance, 1,6-hexanediol, 1,10-decanediol and triethylene glycol as the diol: HO—R$^2$—OH.

A polyurethane, in which $R^1$ is and $R^2$ is $-(CH_2)_6-$, can be prepared according to the same method as that described above using p,p'-biphenol as the diol: $HO-R^1-OH$ and 1,6-hexanediol as the diol: $HO-R^2-OH$.

The polyurethane containing a metal phthalocyanine in the main chain can be used as an redox catalyst. The optimum result can be obtained if the polyurethanes represented by the general formula [I] or [II] in which $R^1$ is and $R^2$ is $-(CH_2)_6-$ are employed. The oxidizing catalyst is particularly effective for the oxidation of 2-mercaptoethanol. Co, Fe, Mn, Ti, V, Ni, Cu, Zn, Mo, W, Os or Ca is preferable as a metal of the metal phthalocyanine while using the polyurethane containing the metal phthalocyanine for redox catalyst. Co, Fe or Mn is more preferable than the other metals.

The polyurethane containing a metal phthalocyanine in the main chain prepared according to the foregoing method can be formed into fibers by a wet spinning technique as will be explained below. The polyurethane containing metal phthalocyanine in the main chain prepared above is first dissolved in dimethylacetamide (DMAc). The resulting solution is mixed with a solution of polyurethane for spinning in DMAc to obtain a stock solution for spinning. The stock solution is spun into a thread through a spinneret of a spinning machine, the thread is guided into a warm water to thus obtain a polyurethane fiber. The obtained polyurethane fiber is a mixed fiber of a polyurethane containing a metal phthalocyanine in the main chain and a polyurethane free of such a modifying group. The fiber preferably comprises the polyurethane containing a metal phthalocyanine in the main chain in an amount of about 10% by weight or more whereby the polyurethane fiber effectively acts as an oxidizing catalyst.

The present invention will become more apparent by referring to the following non-limitative working Examples.

EXAMPLE 1:

Linear Polymer Corresponding to the General Formula [I]

a) Preparation of Metal Phthalocyanine Hydroxy Ester Derivative

To 2.00 g (0.003 mole) of cobalt phthalocyanine dicarboxylic acid which had been sufficiently crushed in a porcelain mortar, there was added 20 ml (0.28 mole) of thionyl chloride and the resulting mixture was refluxed under heating at 110° C. for 20 hours. After completion of the reaction, the reaction mixture was allowed to cool and then evaporated to dryness under a reduced pressure. To the resulting solid product, there was added petroleum ether, then the solid contents were filtered off through a glass filter, dried under reduced pressure to obtain cobalt phthalocyanine dicarboxylic acid chloride.

To the resulting chloride, there was immediately added 50 ml (0.53 mole) of diethylene glycol and the mixture was heated while stirring with a magnetic stirrer. After completion of the reaction, the reaction mixture was allowed to cool and evaporated to dryness under reduced pressure. To the resulting solid product, there was added acetone, the solid was removed by filtration through a glass filter and dried under reduced pressure to give 1.52 g of cobalt phthalocyanine dihydroxyethyl ester. The yield thereof was 67%.

b) Preparation of Polyurethane Containing Metal Phthalocyanine in the Main Chain Cobalt phthalocyanine dicarboxylic acid dihydroxyethyl ester (0.07485 g; $1.0 \times 10^{-4}$ mole) and 1,6-hexanediol (1.16989 g; $9.9 \times 10^{-3}$ mole) were added to a 100 ml volume flask, then 20 ml of dimethylformamide was added to the mixture, the resulting mixture was heated to about 40° C. with stirring to dissolve the solid contents of the flask. To the solution in the flask there was slowly added dropwise 1.682 g ($1.0 \times 10^{-2}$ mole) of hexamethylene diisocyanate. After completion of the dropwise addition, the reaction mixture was heated in an oil bath maintained at 110° C. with stirring for 12 hours. Then the temperature of the oil bath was raised up to 140° C. and the mixture was heated for additional 3 hours with stirring. After the reaction, the contents of the flask was solidified in the form of gel as the reaction mixture was allowed to cool down to room temperature. Then, the reaction mixture was reheated and poured into water while it was still hot to thus cause precipitation. After stirring for about 30 minutes, the solid contents were filtered off through a glass filter. After the solid substances filtered off were stirred for 5 to 8 hours in methanol, they were filtered off through a glass filter and dried under reduced pressure to give 2.81 g of a polyurethane containing cobalt phthalocyanine in the main chain. The yield thereof was 96%.

EXAMPLES 2 to 4:

Linear Polymeric Compounds Corresponding to the General Formula [I]

The same procedures used in Example 1 were repeated to prepare polyurethanes containing cobalt phthalocyanine in the main chain except that ethylene glycol (Example 2), triethylene glycol (Example 3) and tetraethylene glycol (Example 4) were substituted for diethylene glycol used in Example 1, which were reacted with cobalt phthalocyanine dicarboxylic acid chloride.

EXAMPLES 5 to 8:

Cross-linked Polymer Corresponding to the General Formula [II]

The same procedures used in Example 1 were repeated to prepare polyurethane containing cobalt phthalocyanine in the main chain except that cobalt phthalocyanine tetracarboxylic acid was substituted for cobalt phthalocyanine dicarboxylic acid used in Example 1 as a starting material in order to prepare cobalt phthalocyanine tetracarboxylic acid tetrachloride and that ethylene glycol (Example 5), diethylene glycol (Example 6), triethylene glycol (Example 7) and tetraethylene glycol (Example 8), which were diol components to be reacted with cobalt phthalocyanine tetracarboxylic acid tetrachloride, were used in place of diethylene glycol used in Example 1.

Thermal properties of the polyurethanes prepared in Examples 1 to 8 were determined using a differential scanning calorimeter (DSC). In addition, the content of cobalt phthalocyanine present in the polymers was determined by atomic-absorption spectrometry. The amount of the cobalt phthalocyanine (Co-Pc) or the ratio thereof, the Co-Pc content of each polymer obtained and the yield, melting point and decomposition temperature of the polymer are summarized in the following Table I.

TABLE I

| Example No. | Input of Co-Pc (mole %) | Content of Co-Pc (mole %) | Yield (%) | Melting Point (°C.) | Decom. Temp. (°C.) |
| --- | --- | --- | --- | --- | --- |
| 1 | 1.0 | 1.01 | 96 | 161 | 272 |
| 2 | 1.0 | 0.62 | 99 | 158 | 293 |
| 3 | 1.0 | 0.65 | 91 | 163 | 285 |
| 4 | 1.0 | 0.76 | 79 | 157 | 273 |
| 5 | 1.0 | 1.05 | 98 | 157 | 300 |
| 6 | 1.0 | 0.61 | 93 | 161 | 281 |
| 7 | 1.0 | 0.70 | 91 | 160 | 281 |
| 8 | 1.0 | 0.94 | 70 | 158 | 285 |

IR spectra of the polymers obtained in Examples 1 to 8 were measured according to the KBr tablet method. The results obtained are shown in the attached FIG. 1.

Figure 1:
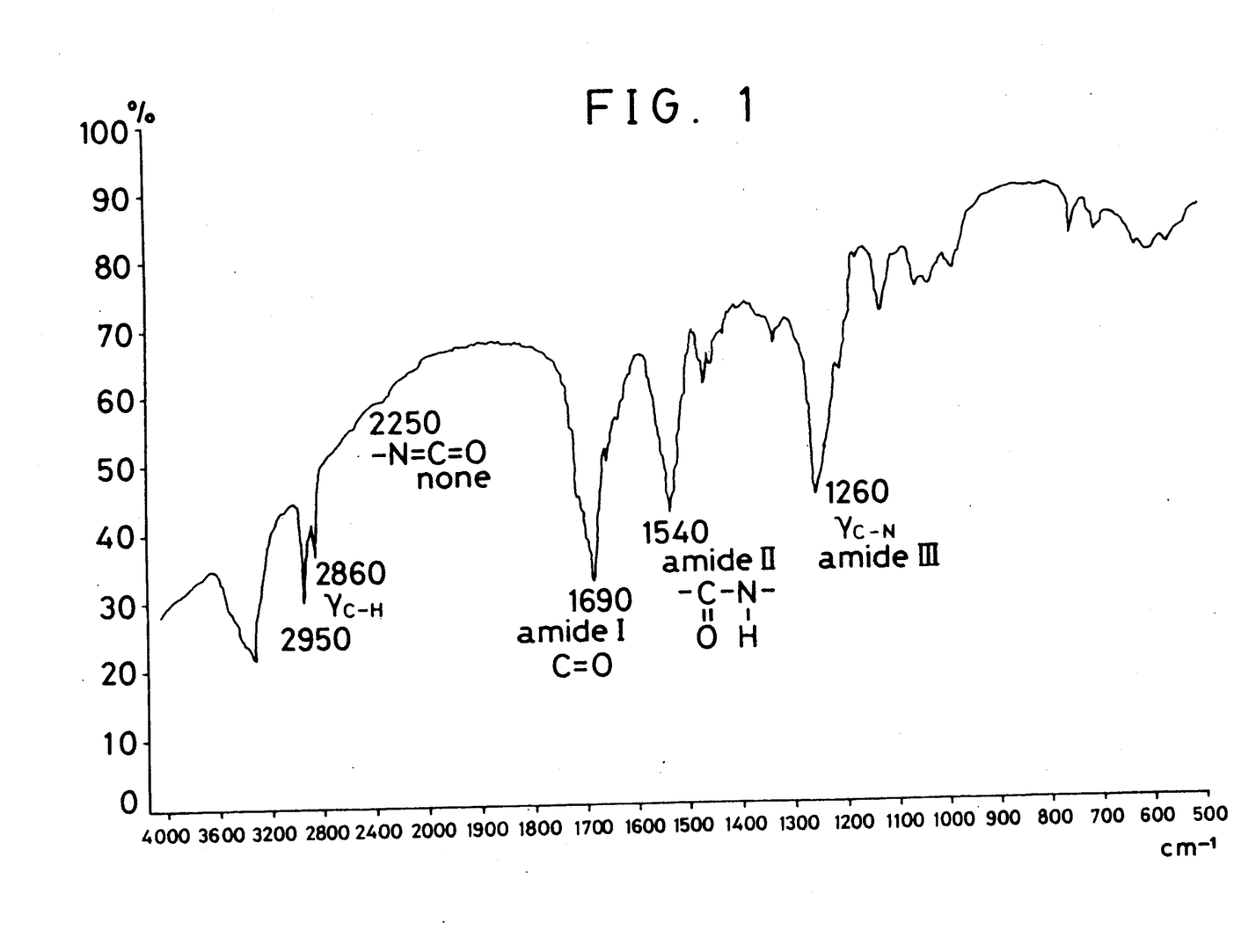
FIG. 1 is an IR spectrum chart for the polyurethane containing a metal phthalocyanine in the main chain according to the present invention.

As seen from FIG. 1, there are observed absorption peaks at 2950 cm$^{-1}$ and 2860 cm$^{-1}$ due to C—H bonds; at 1690 cm$^{-1}$ for the C=O bond in amido groups; at 1540 cm$^{-1}$ for the —C—N— bond in amido groups; and at 1260 cm$^{-1}$ for the bond in amido groups. However, no absorption (at 2250 cm$^{-1}$) for —N=C=O was observed and thus it was confirmed that isocyanate was almost completely reacted.

EXAMPLE 9

Linear Polymeric Compound Corresponding to the General Formula [I]

To 2.00 g of cobalt phthalocyanine dicarboxylic acid which has been sufficiently crushed in a porcelain mortar, there was added 20 ml of thionyl chloride and the resulting mixture was refluxed under heating at 110° C. for 20 hours. After completion of the reaction, the reaction mixture was allowed to cool and then evaporated to dryness under a reduced pressure. To the resulting solid product, there was added petroleum ether, then the solid contents were filtered off through a glass filter, dried under reduced pressure to obtain cobalt phthalocyanine dicarboxylic acid chloride.

To the resulting chloride, there was added 11.28 g of p,p'-biphenol and the mixture was heated at 110° C. for 15 hours while stirring with a magnetic stirrer. After completion of the reaction, the reaction mixture was allowed to cool and evaporated to dryness under reduced pressure. To the resulting solid product, there was added acetone, the solid was removed by filtration through a glass filter and dried under reduced pressure to give 2.74 g of cobalt phthalocyanine dibiphenol ester derivative.

To the resulting cobalt phthalocyanine dibiphenol ester derivative (0.10 g; 1.0×10$^{-4}$ mole), there were added 1.16 g (9.9×10$^{-3}$ mole) of 1,6-hexanediol and 1.82 g (1.1×10$^{-2}$ mole) of 1,6-hexane diisocyanate and the resulting mixture was heated at 140° C. for 12 hours and then at 130° C. for 3 hours in dimethylformamide (DMF) under a nitrogen gas stream. After the reaction, the contents of the flask was solidified in the form of gel as the reaction mixture was allowed to cool down to room temperature. Then, the reaction mixture was reheated and poured into water while it was still hot to thus cause precipitation. After stirring for about 30 minutes, the solid contents were filtered off through a glass filter. After the solid substances filtered off were stirred for 5 to 8 hours in methanol, they were filtered off through a glass filter and dried under reduced pressure to give 2.81 g of a polyurethane containing cobalt phthalocyanine dibiphenol ester in the main chain. The yield thereof was 91%.

EXAMPLE 10

Cross-linked Polymeric Compound Corresponding to the General Formula [II]

The same procedures used in Example 9 were repeated to obtain 2.67 g of a polyurethane containing cobalt phthalocyanine tetrabiphenol ester in the main chain except that cobalt phthalocyanine tetracarboxylic acid was substituted for cobalt phthalocyanine dicarboxylic acid used as a starting material in Example 9. The yield of the product was 86%.

The cobalt content, it means cobalt phthalocyanine content, of the polyurethanes obtained in Examples 9 and 10 was determined by atomic-absorption spectrometry. In addition, thermal properties thereof were also determined with a differential scanning calorimeter (DSC). The cobalt phthalocyanine content (Co-Pc content), yield, melting point and decomposition point of each resulting polymer are listed in the following Table II.

TABLE II

| Example No. | Content of Co-Pc (mole %) | Yield (%) | Melting Point (°C.) | Decom. Temp. (°C.) |
| --- | --- | --- | --- | --- |
| 9 | 1.20 | 91 | 163 | 296 |
| 10 | 1.14 | 86 | 158 | 293 |

2-mercaptoethanol: HO-CH$_2$CH$_2$SH was subjected to an oxygen-oxidation reaction using two kinds of polyurethanes obtained in Examples 9 and 10 as a catalyst and the amount of oxygen consumed during the reaction was determined.

The measurement was performed using a Warburg's manometer. 1.03 mg of polyurethane containing cobalt phthalocyanine dibiphenol ester prepared in Example 9 was introduced into the main chamber of a ground type reaction vessel together with 1 ml of water and 1 ml of a 0.55 mole/l aqueous solution of 2-mercaptoethanol was added to the side chamber of the reaction vessel. The pH value of the 2-mercaptoethanol aqueous solution was adjusted to 7.0 by the addition of potassium hydroxide and its concentration was determined according to iodometric titration. The reaction vessel was placed in a thermostatic chamber to control the temperature to a predetermined constant level, the 2-mercaptoethanol aqueous solution in the side chamber was poured into the main chamber, the mixture was stirred at 136 rpm to admix it and the amount of oxygen consumed was monitored or determined at constant intervals in terms of the reading of the manometer. Separately, only 2-mercaptoethanol was introduced into the reaction vessel and the amount of oxygen consumed through the naturally occurring oxidation under the same conditions as those used above was determined. The concentration of oxygen determined above was corrected for the spontaneous oxidation to obtain a correct amount of oxygen consumed.

Moreover, the same procedures used in the above were repeated to determined the amount of oxygen consumed except that 1.98 mg of polyurethane containing cobalt phthalocyanine tetrabiphenol ester obtained in Example 10 was substituted for polyurethane containing cobalt phthalocyanine dibiphenol ester used above.

Figure 2:
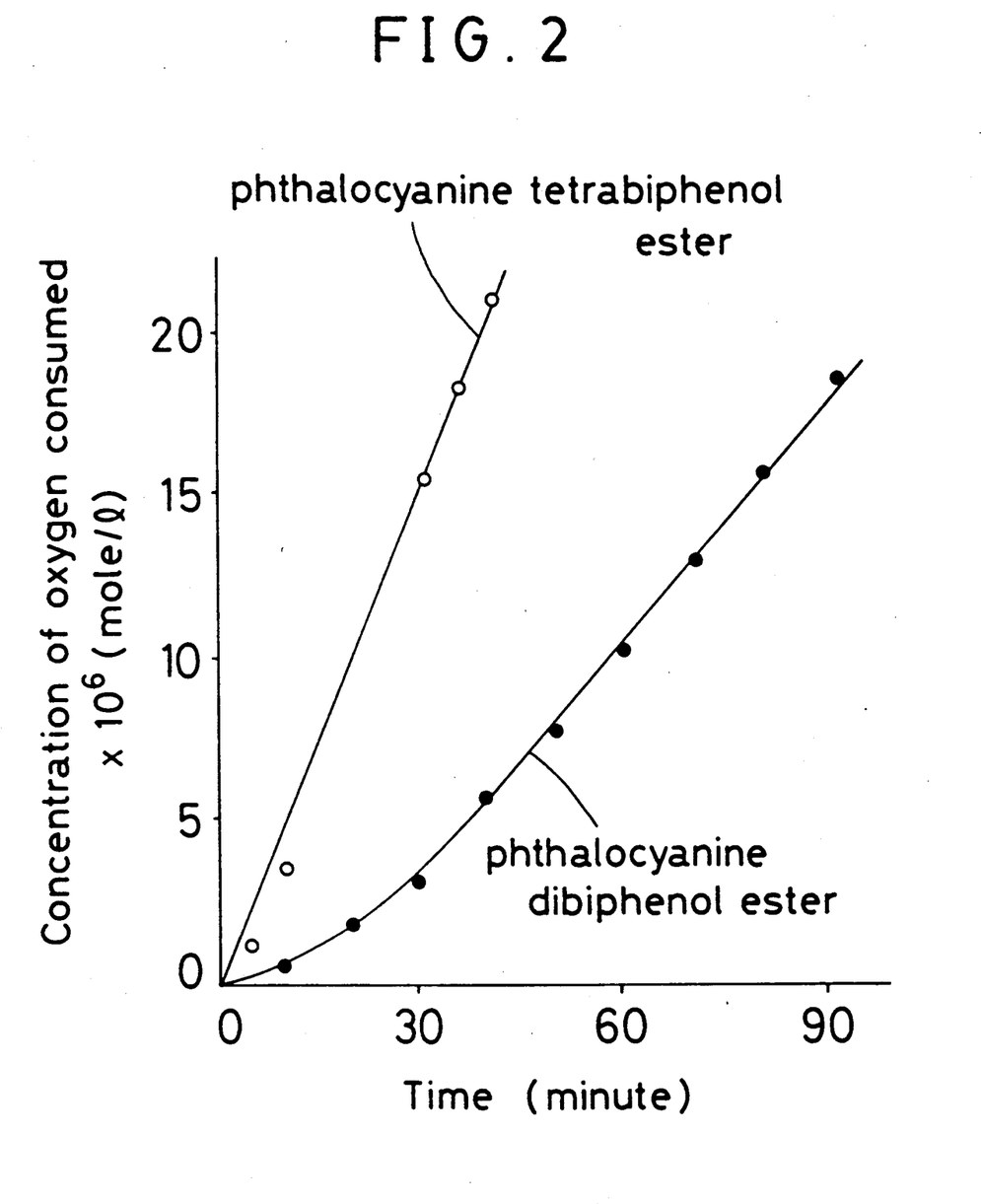
FIG. 2 is a graph showing the concentration of oxygen consumed which is observed when the polyurethane containing a metal phthalocyanine in the main chain is used as a catalyst for oxidizing 2-mercaptoethanol.

FIG. 2 shows the variation, with time, of the amount (mole/l) of consumed oxygen determined above.

In addition, the activation energy for the oxidation reaction of 2-mercaptoethanol in which the catalyst obtained in Example 9 or 10 was employed was obtained using the rate constant $K_5$ of the rate determining process at a temperature ranging from 15° to 35° C. according to the method of Arrhenius. In this respect, the concentration of phthalocyanine was set at a constant value ($1.0 \times 10^{-7}$ mole/l). The activation parameters (reaction rate $V_{max}$, Michaelis constant $K_B$, rate constant $K_5$, activation enthalpy $\Delta H^*$ and activation entropy $\Delta S^*$) are summarized in the following Table III.

TABLE III

| Catalyst | Example 9 Phthalocyanine dibiphenol ester | Example 10 Phthalocyanine tetrabiphenol ester |
|---|---|---|
| $V_{max}$ (mole/l · min) | $2.1 \times 10^{-6}$ | $3.3 \times 10^{-6}$ |
| $K_B$ (mole/l) | $9.1 \times 10^{-1}$ | $4.0 \times 10^{-1}$ |
| $K_5$ (min$^{-1}$) | 20.8 | 33.3 |
| $\Delta H^*$ (Kcal/mole) | +16.1 | +15.9 |
| $\Delta S^*$ (cal/mole · deg) | −6.63 | −6.36 |

EXAMPLE 11

Fiber Comprising Polyurethane Corresponding to the General Formula [I]

The polyurethane containing cobalt phthalocyanine prepared in Example 1 was dissolved in dimethylacetamide (DMAc). The resulting solution and a solution of a polyurethane for spinning (available from NISSHINBO INDUSTRIES, INC.; a stock solution; molecular weight=about 200,000) in DMAc were mixed together in a mixing ratio by weight of 1:9 to obtain a stock solution for spinning. The stock solution was spun into a thread through a spinneret having an inner diameter of 0.4 mmΦ which was maintained at 50° C., and the thread was guided into warm water at 0.5 m/min of spinning rate to thus obtain a polyurethane fiber.

EXAMPLE 12

Fiber Comprising Polyurethane Corresponding to the General Formula [I]

The same procedures used in Example 11 were repeated to form a polyurethane fiber comprising the polyurethane containing cobalt phthalocyanine dibiphenol ester in the main chain except that the polyurethane containing cobalt phthalocyanine dibiphenol ester in the main chain prepared in Example 9 was dissolved in dimethylacetamide (DMAc) and the resulting solution was used for preparing a stock solution for spinning.

EXAMPLE 13

Fiber Comprising Polyurethane Corresponding to the General Formula [II]

The same procedures used in Example 11 were repeated to form a polyurethane fiber comprising the polyurethane containing cobalt phthalocyanine in the main chain except that the polyurethane containing cobalt phthalocyanine in the main chain prepared in Example 5 was dissolved in dimethylacetamide (DMAc) and the resulting solution was used for preparing a stock solution for spinning.

EXAMPLE 14

Fiber Comprising Polyurethane Corresponding to the General Formula [II]

The same procedures used in Example 11 were repeated to form a polyurethane fiber comprising the polyurethane containing cobalt phthalocyanine tetrabiphenol ester in the main chain except that the polyurethane containing cobalt phthalocyanine tetrabiphenol ester in the main chain prepared in Example 10 was dissolved in dimethylacetamide (DMAc) and the resulting solution was used for preparing a stock solution for spinning.

2-mercaptoethanol: $HOCH_2CH_2SH$ was subjected to an oxygen-oxidation reaction using polyurethane fibers obtained in Examples 11 to 14 as a catalyst and the amount of oxygen consumed during the reaction was determined.

The measurement was performed using a Warburg's manometer. Each polyurethane fiber obtained in Example 11 to 14 was introduced into the main chamber of a ground type reaction vessel together with 1 ml of water and 1 ml of a 0.55 mole/l aqueous solution of 2-mercaptoethanol was added to the side chamber of the reaction vessel. The pH value of the 2-mercaptoethanol aqueous solution was adjusted to 7.0 by the addition of potassium hydroxide and its concentration was determined according to iodometric titration.

The reaction vessel was placed in a thermostatic chamber to control the temperature to a predetermined constant level, the 2-mercaptoethanol aqueous solution in the side chamber was poured into the main chamber, the mixture was stirred at 136 rpm to admix it and the amount of oxygen consumed was monitored or determined at constant intervals in terms of the reading of the manometer. Separately, only 2-mercaptoethanol was introduced into the reaction vessel and the amount of oxygen consumed through the naturally occurring oxidation reaction under the same conditions as those used above was determined. The concentration of oxygen determined above was corrected for the spontaneous oxidation to obtain a correct amount of oxygen consumed.

The amount of the polyurethane fiber of each Example used in the measurement are shown in the following Table IV.

TABLE IV

| Example No. | 11 | 12 | 13 | 14 |
|---|---|---|---|---|
| Weight of fiber (mg) | 2.82 | 1.79 | 3.26 | 2.28 |

Figure 3A:
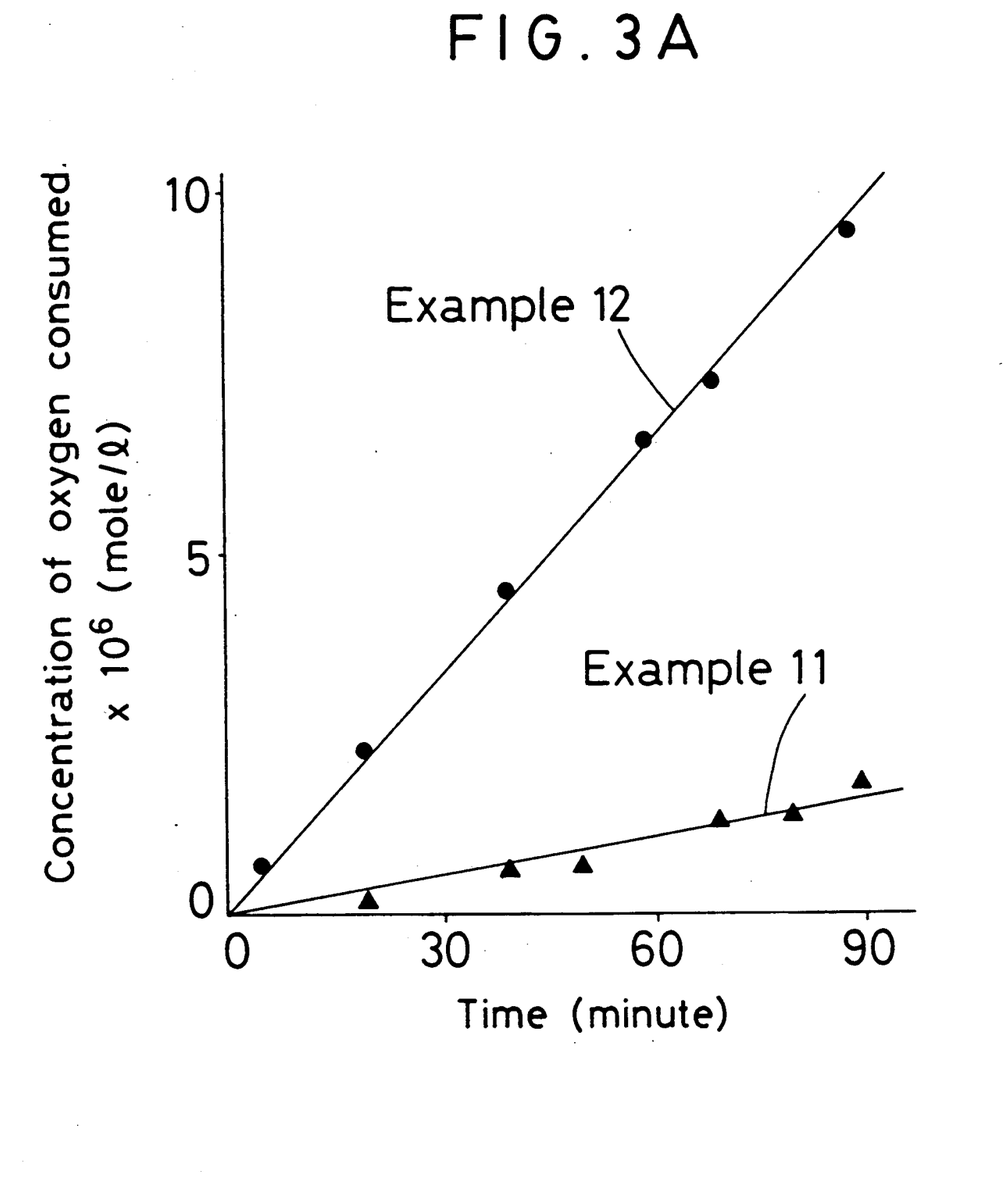
FIGS. 3A and 3B are graphs showing the concentration of oxygen consumed which is observed when the fiber comprising a polyurethane containing a metal phthalocyanine in the main chain is used as a catalyst for oxidizing 2-mercaptoethanol.
Figure 3B:
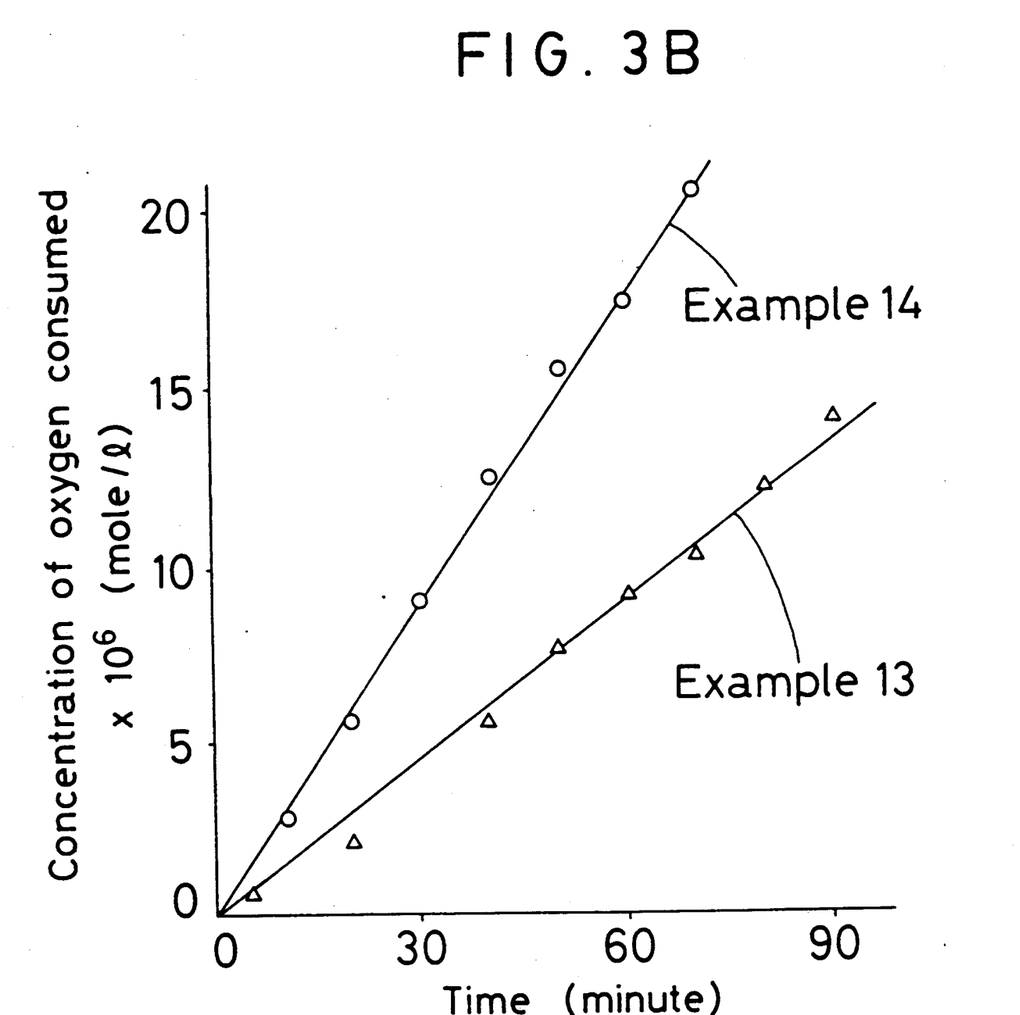

FIGS. 3A and 3B show the variation, with time, in the concentration of oxygen consumed (mole/l) for polyurethane fibers of Examples 11 and 12 (FIG. 3A)

and for polyurethane fibers of Examples 13 and 14 (FIG. 3B), respectively.

In addition, the activation energy for the oxidation reaction of 2-mercaptoethanol in which the catalyst (comprising polyurethane fiber) obtained in Example 11 to 14 was employed was obtained using the rate constant $K_5$ of the rate determining process at a temperature ranging from 15° to 35° C. according to the method of Arrhenius. In this respect, the concentration of phthalocyanine was set at a constant value ($1.0 \times 10^{-7}$ mole/l). The activation parameters (reaction rate $V_{max}$, Michaelis constant $K_B$, rate constant $K_5$, activation enthalpy $\Delta H$ and activation entropy $\Delta S$) are summarized in the following Table V.

wherein $R^1$ represents a group $-(CH_2CH_2O)_n-C_2H_4-$ [n is an integer of 0 to 3],

TABLE V

| Example No. | 11 | 12 | 13 | 14 |
|---|---|---|---|---|
| $V_{max}$ (mole/l · min) | $1.0 \times 10^{-7}$ | $1.0 \times 10^{-6}$ | $4.5 \times 10^{-7}$ | $1.4 \times 10^{-6}$ |
| $K_B$ (mole/l) | $2.5 \times 10^{-1}$ | $4.9 \times 10^{-1}$ | $7.9 \times 10^{-2}$ | $3.1 \times 10^{-1}$ |
| $K_5$ (min⁻) | 1.02 | 10.0 | 4.48 | 14.3 |
| $\Delta H^*$ (Kcal/mole) | +15.1 | +13.8 | +9.34 | +2.23 |
| $\Delta S^*$ (cal/mole · deg) | −16.1 | −15.9 | −32.4 | −53.9 |

What is claimed is:

1. A polyurethane containing a metal phthalocyanine in the main chain comprising repeating units represented by the following general formula [I]:

$R^2$ represents a group $-(CH_2)_6-$, $-(CH_2)_{10}-$ or $-(CH_2CH_2O)_2-C_2H_4-$; M represents a metal atom selected from the group consisting of Co, Fe, Mn, Ti, V, Ni, Cu, Zn, Mo, W, Os and Ca, and x/y ranges from 0.1/99.9 to 90.0/10.0 and which has a molecular weight ranging from 1,000 to 200,000.

2. A polyurethane containing a metal phthalocyanine in the main chain comprising repeating units represented by the following general formula [II]:

-continued wherein R¹ represents a group —(CH$_2$CH$_2$O)$_n$—C$_2$H$_4$— [n is an integer of 0 to 3],

R² represents a group —(CH$_2$)$_6$—, —(CH$_2$)$_{10}$— or —(CH$_2$CH$_2$O)$_2$—C$_2$H$_4$—; M represents a metal atom selected from the group consisting of Co, Fe, Mn, Ti, V, Ni, Cu, Zn, Mo, W, Os and Ca, and x/y ranges from 0.1/99.9 to 90.0/10.0 and which has a molecular weight ranging from 1,000 to 200,000.

3. The polyurethane containing a metal phthalocyanine in the main chain as set forth in claim 1 wherein R¹ is R² is —(CH$_2$)$_6$—; and M is Co, Fe or Mn.

4. A method for preparing a polyurethane containing a metal phthalocyanine in the main chain represented by the foregoing general formula [I] or [II] comprising the steps of reacting a metal phthalocyanine polycarboxylic acid with thionyl chloride to obtain a metal phthalocyanine polycarboxylic acid polychloride; synthesizing a metal phthalocyanine polyhydroxy ester from the metal phthalocyanine polycarboxylic acid polychloride and diol: HO-R¹-OH, wherein R¹ represents a group —(CH$_2$CH$_2$O)$_n$—C$_2$H$_4$— [n is an integer of 0 to 3], through a dehydrochlorination; and then addition-condensation-polymerizing the resulting metal phthalocyanine polyhydroxy ester, a diol: HO—R²—OH, wherein R² represents a group —(CH$_2$)$_6$—, —(CH$_2$)$_{10}$— or —(CH$_2$CH$_2$O)$_2$—C$_2$H$_4$—, and a diisocyanate.

5. The method for preparing a polyurethane containing a metal phthalocyanine in the main chain as set forth in claim 4 wherein the diol: HO—R¹—OH is a member selected from the group consisting of ethylene glycol, diethylene glycol, triethylene glycol, tetraethylene glycol, 1,6-hexanediol and p,p'-biphenol; the diol: HO—R²—OH is a member selected from the group consisting of 1,6-hexanediol, 1,10-decanediol and triethylene glycol; and the diisocyanate is hexamethylene diisocyanate.

6. The method for preparing a polyurethane containing a metal phthalocyanine in the main chain as set forth in claim 5 wherein the diol: HO—R¹—OH is p,p'-biphenol;

and the diol: HO-R²-OH is 1,6-hexanediol, HO—(CH$_2$)$_6$—OH.

7. A polymer catalyst for redox reactions comprising repeating units represented by the following general formula:

[I]

wherein $R^1$ represents a group $-(CH_2CH_2O)_n-C_2H_4-$ [n is an integer of 0 to 3],

$R^2$ represents a group $-(CH_2)_6-$, $-(CH_2)_{10}-$ or $-(CH_2CH_2O)_2-C_2H_4-$; M represents a metal atom selected from the group consisting of Co, Fe, Mn, Ti, V, Ni, Cu, Zn, Mo, W, Os and Ca, and x/y ranges from 0.1/99.9 to 90.0/10.0 and which has a molecular weight ranging from 1,000 to 200,000.

8. A polymer catalyst for redox reactions comprising repeating units represented by the following general formula [II]:

[II]

wherein $R^1$ represents a group $-(CH_2CH_2O)_n-C_2$-$H_4-$[n is an integer of 0 to 3], $R^2$ represents a group $-(CH_2)_6-$, $-(CH_2)_{10}-$ or $-(CH_2CH_2O)_2-C_2H_4-$; M represents a metal atom selected from the group consisting of Co, Fe, Mn, Ti, V, Ni, Cu, Zn, Mo, W, Os and Ca, and x/y ranges from 0.1/99.9 to 90.0/10.0 and which has a molecular weight ranging from 1,000 to 200,000.

9. The polymer catalyst as set forth in claim 7 wherein $R^1$ is $R^2$ is —$(CH_2)_6$—; and M is Co, Fe or Mn.

10. The polymer catalyst as set forth in claim 9 wherein $R^1$ is

$R^2$ is —$(CH_2)_6$—; and M is Co.

11. The polymer catalyst as set forth in claim 10 wherein it is a catalyst for oxidizing 2-mercaptoethanol.

12. A fiber comprising a polyurethane containing a metal phthalocyanine in the main chain which comprises repeating units represented by the following general formula [I]:

[I]

wherein $R^1$ represents a group —$(CH_2CH_2O)_n$—$C_2H_4$— [n is an integer of 0 to 3],

$R^2$ represents a group —$(CH_2)_6$—, —$(CH_2)_{10}$— or —$(CH_2CH_2O)_2$—$C_2H_4$—; M represents a metal atom selected from the group consisting of Co, Fe, Mn, Ti, V, Ni, Cu, Zn, Mo, W, Os and Ca, and x/y ranges from 0.1/99.9 to 90.0/10.0 and which has a molecular weight ranging from 1,000 to 200,000.

13. A fiber comprising a polyurethane containing a metal phthalocyanine in the main chain which comprises repeating units represented by the following general formula [II]:

[II]

wherein R¹ represents a group —(CH₂CH₂O)$_n$—C₂H₄— [n is an integer of 0 to 3],

R² represents a group —(CH₂)₆—, —(CH₂)₁₀— or —(CH₂CH₂O)₂—C₂H₄—; M represents a metal atom selected from the group consisting of Co, Fe, Mn, Ti, V, Ni, Cu, Zn, Mo, W, Os and Ca, and x/y ranges from 0.1/99.9 to 90.0/10.0 and which has a molecular weight ranging from 1,000 to 200,000.

14. The fiber as set forth in claim 12 wherein R¹ is

R². is —(CH₂)₆—; and M is Co, Fe or Mn.

15. The fiber as set forth in claim 12 wherein it comprises the polyurethane containing a metal phthalocyanine in the main chain and a polyurethane free of a metal phthalocyanine in the main chain.

16. The fiber as set forth in claim 15 wherein the amount of the polyurethane containing a metal phthalocyanine in the main chain is at least 10% by weight on the basis of the total weight of the fiber.

17. A method for preparing a polyurethane fiber which comprises a polyurethane containing a metal phthalocyanine in the main chain composed of repeating units represented by the foregoing general formula [I] or [II], the method comprising the steps of reacting a metal phthalocyanine polycarboxylic acid with thionyl chloride to obtain a metal phthalocyanine polycarboxylic acid polychloride; synthesizing a metal phthalocyanine polyhydroxy ester from the metal phthalocyanine polycarboxylic acid polychloride and a diol: HO—R¹—OH, wherein R¹ represents a group —(CH₂CH₂O)$_n$—C₂H₄— [n is an integer of 0 to 3], through a dehydrochlorination; then addition-condensation-polymerizing the resulting metal phthalocyanine polyhydroxy ester, a diol: HO—R²—OH, wherein R² represents a group —(CH₂)₆—, —(CH₂)₁₀— or —(CH₂CH₂O)₂—C₂H₄—, and a diisocyanate to obtain a polyurethane containing a metal phthalocyanine in the main chain; dissolving the polyurethane containing a metal phthalocyanine in the main chain in an organic solvent to form a stock solution for spinning; and subjecting the stock solution to wet spinning to form a fiber.

18. The method for preparing a polyurethane fiber as set forth in claim 17 wherein the organic solvent is dimethylacetamide.

19. The method for preparing a polyurethane fiber as set forth in claim 17 wherein a stock solution for spinning is prepared by admixing a solution of polyurethane containing a metal phthalocyanine in the main chain in an organic solvent with a solution of a polyurethane free of a metal phthalocyanine in the main chain in an organic solvent and the stock solution for spinning is subjected to wet spinning.

20. The method for preparing a polyurethane fiber as set forth in claim 19 wherein the both organic solvents for preparing the solutions of the polyurethane containing a metal phthalocyanine in the main chain and the polyurethane free of a metal phthalocyanine in the main chain are dimethylacetamide.

* * * * *